July 19, 1938.   J. EGGERT ET AL   2,124,139
APPARATUS FOR PROJECTING LENTICULAR FILM
Filed Nov. 3, 1934    2 Sheets-Sheet 1

Inventors:
John Eggert,
Gerd Heymer,
By Attorneys
Potter, Pierce & Scheffler

July 19, 1938.  J. EGGERT ET AL  2,124,139
APPARATUS FOR PROJECTING LENTICULAR FILM
Filed Nov. 3, 1934  2 Sheets-Sheet 2

Inventors:
John Eggert,
Gerd Heymer,
By Attorneys
Potter, Pierce & Scheffler.

Patented July 19, 1938

2,124,139

UNITED STATES PATENT OFFICE 2,124,139

APPARATUS FOR PROJECTING LENTICULAR FILM

John Eggert, Leipzig-Gohlis, and Gerd Heymer, Wolfen Kreis Bitterfeld, Germany, assignors to I. G. Farbenindustrie Aktiengesellschaft, Frankfort-on-the-Main, Germany Application November 3, 1934, Serial No. 751,370 In Germany November 8, 1933

4 Claims. (Cl. 88—16.4)

Our present invention relates to the projection of lenticular film.

Figure 1:
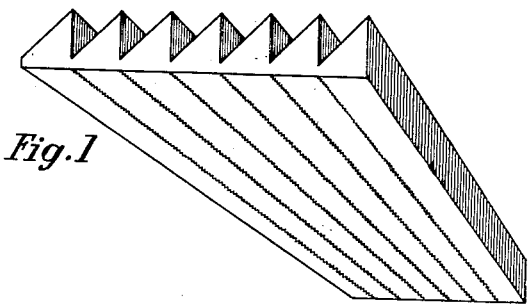
Figure 2:
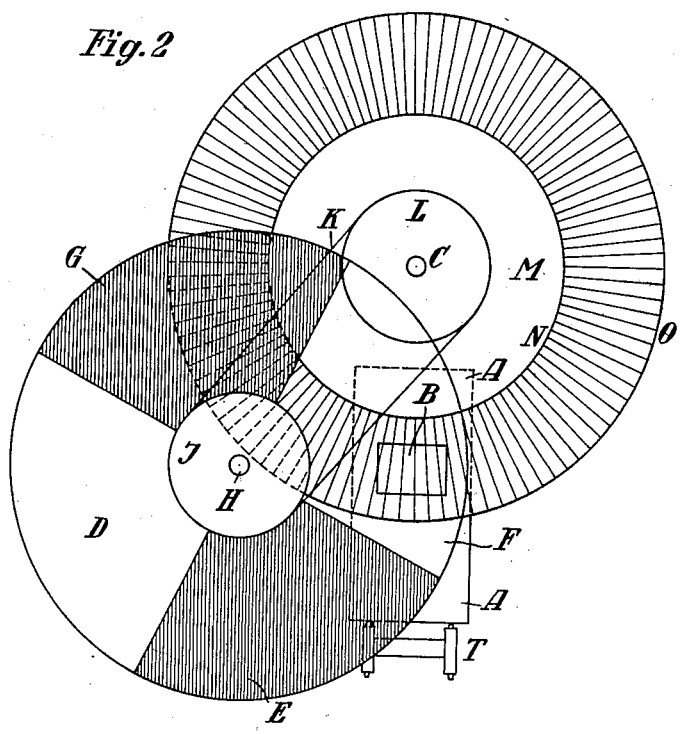

One of its objects is an apparatus for projecting lenticular film in natural colors. Further objects will be seen from the detailed specification following hereafter. Reference is made to the accompanying drawings in which Fig. 1 shows a prism grating to be used according to this invention, and Fig. 2 shows diagrammatically an arrangement for projecting lenticular film according to the invention.

Figure 3:
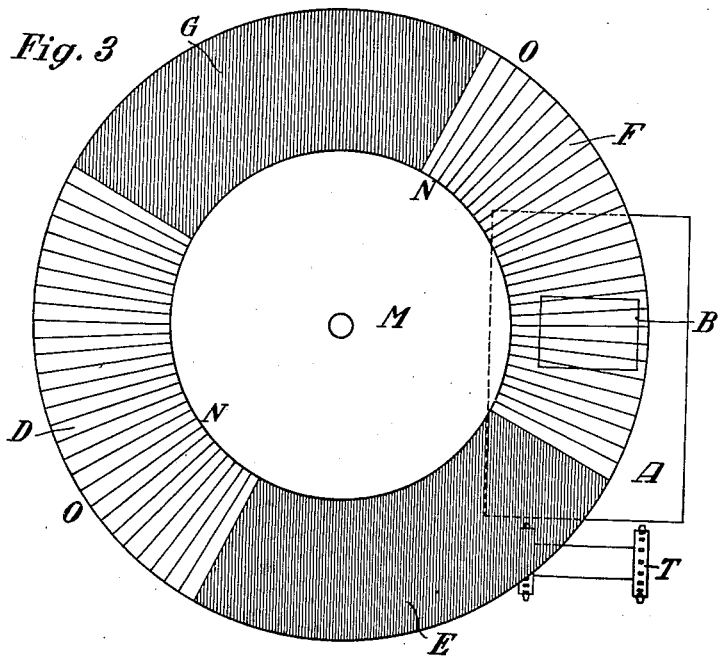
Figure 4:
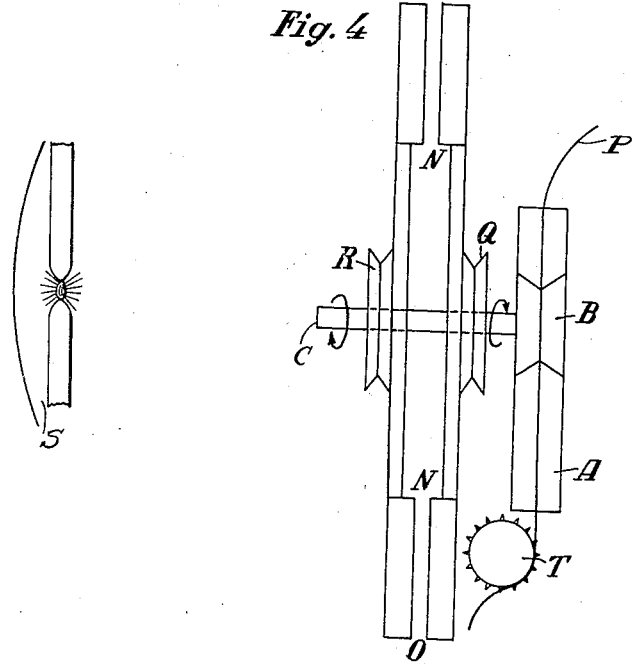

Fig. 3 shows diagrammatically a modified arrangement for projecting lenticular film according to the invention, and Fig. 4 shows a further modification for projecting in accordance with the invention.

A known method (see British Patent No. 24,276 of 1914) of projecting a lenticular film in colors consists in substituting for the usual three-color filter placed between the source of light and the film, the embossed side of which faces the source of light, a device which decomposes into its spectral constituents the light incident upon the film. Thus, just as in projection with the aid of three-color filters, pencils of light of various colors are produced, in which the three primary colors red, green and blue are represented. These pencils of light, exactly as in the case of a three-color filter, strike the film in different directions and in like manner produce a colored projection of the film.

It is necessary that the device for spectral decomposition of light should be such that the angle subtended by the range of colors from the extreme blue to the extreme red is as large as that subtended with a corresponding three-color filter so that the spectrum produced by the film grating will register with the corresponding color components recorded on the film. For certain optical reasons this angle must not be smaller than a certain limit which depends on the width of the lenticulations and the thickness of the film. In order to attain a sufficient dispersion it is therefore necessary that prisms used for the purpose should be made of highly dispersive material. As such materials liquids are available but they are very easily decomposed in the light of an arc lamp; alternatively glass may be used but the glass is usually of marked yellow color. The prisms have to be so thick that this color is disagreeably in evidence in the projected picture. When direct-vision prisms are used the dimensions have to be such that it becomes difficult to place the device in the path of the rays in the usual cinematographic apparatus. For avoiding these difficulties it has been proposed that prismatic gratings composed of a number of small prismatic rods should be placed in the immediate vicinity of the picture window. Such gratings, however, have the disadvantage of slight dispersion; furthermore, when they are wider than the lenticulations they produce dark striae across the picture field, and when their width is of the same order of magnitude as that of the lenticulations they produce a moiré effect with the lenticular embossing.

The striae are produced in a manner which will be understood by considering Fig. 1. This figure shows a prism grating from below. If light is projected on the prismatic elements from above, for instance, from an arc lamp, then at the places where the steep edge of a prismatic element touches the next prismatic element, there are produced dark lines, because owing to reflections at the steep edges part of the light is projected in a wrong direction. The dark stripes are characterized by wave lines.

The present invention relates to a method of attaining the desired object, while minimizing the foregoing disadvantages, which consists in rapidly moving, during the projection, a prismatic grating in the vicinity of the picture window, between the source of light and the film, the embossed side of which faces the said source. In this manner the non-transparent striae, produced by the edges of the prisms, are moved beyond the picture field and are no longer visible. For the invention there may be used a prism grating of which the elements have a breadth of 1 cm. to 1/10 mm. or a prism grating operating by interference having a breadth of the elements in the dimension of $\mu$. The angle subtended by the range of colors is determined by the material, that is to say by its index of refraction and by the angle of refraction of the prisms. According to Müller Pouillet, Vol. II, first part (optics) pages 259 to 261, the following equations are applicable to a direct vision prism:

$$w_{400/700} = \sigma(n_{550}-1)\left[\frac{n_{400}-n_{700}}{n_{550}-1} - \frac{n'_{400}-n'_{700}}{n'_{550}-1}\right]$$

$$0 = \sigma(n_{550}-1) - \sigma'(n'_{550}-1)$$

$w_{400/700}$ is the angle subtended by the spectrum produced by the direct vision prism and being equal to the angle subtended by the multi-color filter when viewed from the film in taking, $n$ and $n'$ are the refractive indices of the prisms respectively which form the direct vision prism, and σ and σ' are the refractive angles of the two prisms.

The prismatic grating is preferably in the form of a disc which is caused to rotate in a plane intercepting the light between the source and the film. In Figure 2, A is the picture gate of a cinematographic projector, B is the gate aperture, and T is the sprocket drum driven by a geneva (not shown). The lenticular elements extend perpendicularly. DEFG is the rotating shutter disk which may be arranged before or behind the film. The rotating disk has parts G and E which are opaque and parts D and F which are transparent. On the axle H of this disk there is mounted the driving roller J which by means of a cord K drives the roller L on the axle C. The prism disk M consisting of a series of radially arranged prism elements placed between the circles N and O is connected with the roller L. The direction of motion is arbitrary.

The diameter of the rotating disk is as large as practicable, so that the convergence of the prisms at the centre of the disk becomes of no importance in the effect produced. It is advantageous that the prismatic gratings should be used in combination with a rotating diaphragm (Fig. 3), in the apertures of which the prisms are arranged. Such an arrangement is shown in Fig. 3. In this figure, B is the picture gate and T is the sprocket drum driven by a geneva for intermittently advancing the film. The prisms are arranged between the circles N and O, so that they are substantially parallel, and occupy the required parts F and D of the rotating disk M, whereas the parts G and E between the parts F and D are opaque. Care must be taken that the prisms are parallel with the lenticular elements. Therefore if a rotating disk of an ordinary cinematographic projector is modified to suit the invention, there is used a lenticular film with the lenticular elements extending transversely, because in ordinary cinematographic apparatus the rotating disk passes over the gate aperture from top to bottom. In this case the rotating shutter disk must be arranged behind the lenticular film, that is to say between the source of light and the film.

In order that the maximum dispersion can be obtained a number of prismatic gratings may be mounted on the same axis and caused to rotate, all in the same direction, or some in one direction and others in the opposite direction. The latter case is shown in Fig. 4. In this figure, A is again the picture gate, B is the gate aperture, and T is the sprocket drum driven by a geneva for advancing the film P. The two rotating disks are connected each with a pulley Q and R one of which is loosely mounted on the axle C whereas the other is fixedly connected therewith. The pulleys are driven so as to rotate in opposite direction. The film is illuminated by means of the source of light S.

An apparatus comprising this invention has the advantage that while a sufficiently high degree of dispersion is produced, the space occupied by the prismatic device is relatively small. Furthermore, strongly yellow materials may be used since the thickness of the material suffices to produce the desired effect, but is not great enough to affect the coloring of the picture. The prismatic grating or gratings may be driven by the driving mechanism of the projection apparatus.

What we claim is:

1. Apparatus for projecting motion pictures in natural colors comprising a source of light, a cylindrically lenticulated film bearing color records the lenticular side of which film faces the light source, said film being positioned in an apertured film gate, a prism grating movable in the vicinity of and in a plane parallel to the film gate aperture and composed of a plurality of prisms which are wider than the lenticulations of the film, the individual prisms being radially arranged as a ring about the periphery of a disc, the axis of rotation of the ring being parallel to the central axis of the film gate, said grating being movably supported between the light source and the film in a plane parallel to the film with the prism spectrum including the range of colors from the extreme blue to the extreme red imaged by each lenticulation in register with the color filter records back of the lenticulation and with the long axis of one of the prisms of said grating which fall directly between the light source and the central axis of the film gate parallel to the film lenticulations, and means for rapidly moving the prism grating in said plane so that said prisms move in a direction substantially transversely to the film lenticulations at a rate sufficient to render invisible dark striae produced by the edges of the prisms.

2. Apparatus for projecting motion pictures in natural colors comprising a source of light, a cylindrically lenticulated film bearing color records the lenticular side of which film faces the light source, said film being positioned in an apertured film gate, a prism grating composed of a plurality of prisms which are wider than the lenticulations of the film, the individual prisms being radially arranged as a ring, said prism grating being mounted upon the periphery of a rotatable disc so positioned as to intercept light between the source thereof and the film gate aperture, so that the long axes of the prisms thereof are aligned with the radii of the disc, said grating and disc being interposed between the light source and the film in a plane parallel to the film and with the long axis of one of the prisms of said grating which falls directly between the light source and the central axis of the film gate parallel to the film lenticulations with the prism spectrum including the range of colors from the extreme blue to the extreme red imaged by each lenticulation in register with the color filter records back of the lenticulation, and means for rapidly rotating the disc in said plane so that said prisms move in a direction substantially transversely to the film lenticulations at a rate sufficient to render invisible the dark striae produced by the edges of the prisms.

3. Apparatus for projecting motion pictures in natural colors comprising a source of light, a cylindrically lenticulated film bearing color records the lenticular side of which film faces the light source, said film being positioned in an apertured film gate, said light source being situated at a distance from the film equal to that of the virtual image of the multi-color filter used for taking the color records, a rotatable apertured diaphragm in an aperture of which a prism grating is arranged, said grating being composed of a plurality of prisms of a width of 0.1–10 mm., said prism grating being mounted upon the periphery of the diaphragm so that the long axis of the prisms thereof are aligned with the radii of the diaphragm, the diaphragm being interposed between the light source and the film and as close as possible to and in a plane parallel with the lenticular surface of the film and having the long axis of one of the prisms of said grating which falls directly between the light source and the central axis of the film gate parallel to the film lenticulations with the prism spectrum including the range of colors from the extreme blue to the extreme red imaged by each lenticulation in register with the color filter records back of the lenticulation, and means for rapidly rotating the diaphragm in said plane so that said prisms move in a direction substantially transversely to the film lenticulations at a rate sufficient to render invisible the dark striae produced by the edges of the prisms, a non-apertured portion of said diaphragm acting as a shutter.

4. Apparatus for projecting motion pictures in natural colors comprising a source of light, a cylindrically lenticulated film bearing color records the lenticular side of which film faces the light source, said film being positioned in an apertured film gate, said light source being situated at a distance from the film equal to that of the virtual image of the multi-color filter used for taking the color records, a plurality of rotatable prism gratings coaxially mounted and capable of being rotated individually in either direction, said prism gratings being composed of a plurality of prisms of a width of 0.1 to 10 mm., said prism gratings being mounted upon the peripheries of discs so that the long axes of the prisms are aligned with the radii of the discs, said discs being mounted as close as possible one to another and to the film and interposed between the light source and the film in planes parallel to the surface of the film and having the long axis of one of the prisms of said gratings which falls directly between the light source and the central axis of the film gate parallel to the film lenticulations with the prism spectrum including the range of colors from the extreme blue to the extreme red imaged by each lenticulation in register with the color filter records back of the lenticulation, and means for rapidly rotating the discs in said planes so that said prisms move in directions substantially transversely to the film lenticulations at a rate sufficient to render invisible the dark striae produced by the edges of the prisms.

JOHN EGGERT.
GERD HEYMER.